United States Patent

Po' et al.

[11] Patent Number: 5,889,129
[45] Date of Patent: Mar. 30, 1999

[54] PROCESS FOR THE PREPARATION OF ACRYLONITRILE COPOLYMERS WITH AT LEAST ONE (DI) OLEFIN

[75] Inventors: Riccardo Po', Livorno; Luisa Fiocca, Novaro, both of Italy

[73] Assignee: Enichem S.p.A., Milan, Italy

[21] Appl. No.: 104,240

[22] Filed: Jun. 25, 1998

[30] Foreign Application Priority Data

Jul. 18, 1997 [IT] Italy ................. MI97A01704

[51] Int. Cl.$^6$ ................. C08F 4/643; C08F 236/12
[52] U.S. Cl. ................. 526/160; 526/338; 526/342; 526/943
[58] Field of Search ................. 526/160, 338, 526/342, 335, 943

[56] References Cited

U.S. PATENT DOCUMENTS

| | | | |
|---|---|---|---|
| 2,924,593 | 2/1960 | Breslow | 526/160 |
| 5,049,535 | 9/1991 | Resconi et al. | 526/160 X |
| 5,086,135 | 2/1992 | Kissin | 526/160 X |
| 5,391,671 | 2/1995 | Tazaki et al. | 526/160 X |

*Primary Examiner*—Fred Teskin
*Attorney, Agent, or Firm*—Oblon, Spivak, McClelland, Maier & Neustadt, P.C.

[57] ABSTRACT

Process for the preparation of acrylonitrile copolymers with at least one (di)olefin which comprises reacting the monomers in the presence of a catalytic system essentially consisting of:

i) a complex of zirconium having the general formula:

$$ZrA_aB_b \qquad (I)$$

wherein A represents a cyclopentadienyl, indenyl or fluorenyl group, B represents a hydrogen atom, a halogen or a $C_1$–$C_8$ (iso)alkyl, alkoxyl or carboxyl radical;

ii) an aluminumalkyl halide having the general formula:

$$AlR_nX_m \qquad (II)$$

wherein R represents a $C_1$–$C_4$ (iso)alkyl group, X is a halogen.

8 Claims, No Drawings

PROCESS FOR THE PREPARATION OF ACRYLONITRILE COPOLYMERS WITH AT LEAST ONE (DI) OLEFIN

The present invention relates to a process for the preparation of acrylonitrile copolymers with at least one (di) olefin.

More specifically, the present invention relates to a process for the preparation of acrylonitrile copolymers with at least one (di)olefin, with an alternating structure and the catalytic system, based on zirconium, suitable for the purpose.

Acrylonitrile/diolefin copolymers are normally obtained by radicalic polymerization in solution. They contain about 50% by weight of acrylonitrile and have a random microstructure.

These products are widely used for numerous applications such as, for example, for preparing pipes, as additives for fuels and lubricants, as raw material for joints and seals in the car and petroleum industries.

Acrylonitrile/butene/ethylene copolymers are obtained by a two-step process; the first comprises the radicalic copolymerization of acrylonitrile and butadiene and gives the products described in the previous paragraph; the second involves the catalytic hydrogenation of acrylonitrile/butadiene rubbers and produces so-called hydrogenated nitrile rubbers (HNBR). These materials have an improved thermal resistance, resistance to light and solvents. These products, however, are relatively expensive as they are obtained in two steps, and the process for their production is also complex, especially with respect to the hydrogenation step which must be carried out in solutions of suitable solvents which must then be disposed of.

It would therefore be preferable to obtain copolymers with an HNBR structure in a single synthetic step.

Scientific literature describes the use of catalytic systems based on $ZnCl_2$ and organic peroxides (for example Polymer Letters, 7, 443, 1969), aluminum alkyl halides (U.S. Pat. No. 3,647,753), vanadium compounds mixed with derivatives of aluminum (Polymer Letters, 7, 47, 1969) for the preparation of copolymers with an alternating acrylonitrile/diolefin structure. Although these polymers have improved mechanical characteristics compared to HNBR (Hydrogenated Nitrile Butadiene Rubbers) or NBR (Nitrile Butadiene Rubbers), they are partially cross-linked and consequently have modified properties owing to the action of the peroxides used as initiator agents, or are strongly coloured due to the catalytic residues of the vanadium-based complex.

With the use of analogous catalytic systems, acrylonitrile/olefin copolymers have also been prepared (U.S. Pat. No. 3,700,648).

Zirconium complexes combined with alkylaluminum halides have never been illustrated. In literature only catalytic systems based on zirconium complexes, such as ethylidenebis(indenyl)zirconium dichloride [$Et(Ind)_2ZrCl_2$], ethylidenebis(tetrahydroindenyl)zirconium dichloride [$Et(H_4Ind)_2ZrCl_2$], combined with mixtures comprising methylaluminoxane (MAO), have been tested. These systems, however, have proved to be unable to efficiently copolymerize acrylonitrile with olefins and have led to the non- or very limited incorporation of acrylonitrile into the polyolefin obtained (Journal of Macromolecular Science—Pure Applied Chemistry, A34, 361 1997).

The Applicant has now found that catalytic systems consisting of particular complexes of zirconium, described hereunder, and aluminumalkyl halides can be used in the preparation of acrylonitrile/(di)olefin copolymers with an alternating structure as they allow products without the above defects to be obtained.

The present invention therefore relates to a process for the preparation of copolymers of acrylonitrile with at least one (di)olefin which comprises reacting the monomers in the presence of a catalytic system essentially consisting of:

i) a complex of zirconium having the general formula:

$$ZrA_aB_b \qquad (I)$$

wherein A represents a cyclopentadienyl, indenyl or fluorenyl group, optionally substituted with $C_1$–$C_4$ alkyl groups, B represents a hydrogen atom, a halogen or a $C_1$–$C_8$ (iso)alkyl, alkoxyl or carboxyl radical, a is an integer equal to 1 or 2, b is an integer equal to 2 or 3, with a+b=4;

ii) an aluminumalkyl halide having the general formula:

$$AlR_nX_m \qquad (II)$$

wherein R represents a $C_1$–$C_4$ (iso)alkyl group, X is a halogen, m and n are integers equal to 1 or 2 so that m+n=3.

Zirconium complexes which are particularly suitable for the embodiment of the present invention are those in which A represents a cyclopentadienyl (Cp), bis(cyclopentadienyl), pentamethylcyclopentadienyl (Cp*), indenyl (Ind), bis (indenyl), fluorenyl (Flu), bis(fluorenyl) group. When a=2, the A groups can also be different from each other and can optionally be joined by an alkenyl bridge, for example a methylene or ethylene bridge.

Illustrative examples of zirconium complexes which can be used in the present invention are: $CpZrCl_3$; $CpZrBr_3$; $Cp_2ZrCl_2$; $Cp_2ZrBr_2$; $Cp*ZrCl_3$; $Cp*ZrBr_3$; $Cp_2ZrCl_2$; $Cp*_2ZrBr_2$; $CpZr(OCH_3)_3$; $CpZr(OC_2H_5)_3$; $Cp*_2Zr(OCH_3)_2$; $Cp_2Zr(OC_2H_5)_2$; $Cp*Zr(OCH_3)_3$; $Cp*Zr(OC_2H_5)_3$ $Cp*_2Zr(OCH_3)_2$; $Cp*_2Zr(OC_2H_5)_2$; $CpZr(CH_3)_3$; $CpZr(C_2H_5)_3$; $Cp*ZrH_3$; $Cp*Zr(CH_3)_3$; $Cp*Zr(C_2H_5)_3$; $Cp_2ZrH_2$; $Cp_2Zr(CH_3)_2$; $Cp*_2ZrH_2$; $Cp*_2Zr(CH_3)_2$; $IndZrCl_3$; $IndZrBr_3$; $Ind_2ZrCl_2$; $IndZr(OCH_3)_3$; $IndZr(OC_2H_5)_3$; $Ind_2Zr(OCH_3)_2$; $IndZrH_3$; $IndZr(CH_3)_3$; $IndZr(C_2H_5)_3$; $Ind_2ZrH_2$; $Ind_2Zr(CH_3)_2$; $FluZrCl_3$; $FluZrBr_3$; $Flu_2ZrCl_2$; $FluZr(OCH_3)_3$; $Flu_2Zr(OCH_3)_2$; $FluZrH_3$; $FluZr(CH_3)_3$; $CpCp*ZrCl_2$; $CpCp*Zr(OCH_3)_2$; $CpCp*ZrH_2$; $CpCp*Zr(CH_3)_2$; $CpIndZrCl_2$; $CpIndZr(OCH_3)_2$; $CpIndZrH_2$; $CpIndZr(CH_3)_2$; $CpFluZrCl_2$; $CpFluZr(OCH_3)_2$; $CpFluZrH_2$; $CpFluZr(CH_3)_2$; $Cp*IndZrCl_2$; $Cp*IndZr(OCH_3)_2$; $Cp*IndZrH_2$; $Cp*IndZr(CH_3)_2$; $Cp*FluZrCl_2$; $Cp*FluZr(OCH_3)_2$; $Cp*FluZrH_2$; $Cp*FluZr(CH_3)_2$; $IndFluZrCl_2$; $IndFluZr(OCH_3)_2$; $IndFluZrH_2$; $IndFluZr(CH_3)_2$; $CH_2(Cp)_2ZrCl_2$; $CH_2(Cp)_2Zr(OCH_3)_2$; $CH_2(Cp)_2ZrH_2$; $CH_2(Cp)_2Zr(CH_3)_2$; $CH_2(Ind)_2ZrCl_2$; $CH_2(Ind)_2Zr(OCH_3)_2$; $CH_2(Ind)_2Zr(CH_3)_2$; $CH_2(Flu)_2Zr(H_3)_2$; $CH_2(Cp)(Ind)ZrCl_2$; $Et(Cp)_2ZrCl_2$; $CH_2(Cp)(Ind)Zr(OCH_3)_2$; $CH_2(Cp)(Ind)ZrH_2$; $Et(Cp)_2ZrH_2$; $CH_2(Flu)(Ind)ZrCl_2$; $CH_2(Cp)(Ind)Zr(CH_3)_2$; $CH_2(Flu)(Ind)Zr(OCH_3)_2$; $CH_2(Flu)(Ind)ZrH_2$; $CH_2(Flu)(Ind)Zr(CH_3)_2$; $CH_2(Flu)(Cp)ZrCl_2$; $CH_2(Flu)(Cp)Zr(CH_3)_2$; $Et(Cp)_2Zr(OCH_3)_2$; $Et(Ind)_2ZrBr_2$; $Et(Flu)_2ZrCl_2$; $Et(Flu)_2Zr(CH_3)_2$; $Et(Cp)(Ind)ZrCl_2$; $Et(Cp)(Ind)Zr(CH_3)_2$; $Et(Flu)(Ind)ZrCl_2$.

Complexes of zirconium having general formula (I) are products which are known in scientific literature. They can be prepared as described in "Chemistry of organo-zirconium and -hafnium compounds", Ellis Horwood, New York, 1986 or in "Chemical Reviews", vol. 92, pages 807–832 or 965–994, 1992.

Aluminumalkyl halides particularly suitable for the embodiment of the present invention are: chloroaluminumdiethyl, dichloroaluminum ethyl; bromoaluminumdiethyl; dibromoaluminumethyl; or the products obtained from the reaction of an aluminum alkyl, for example aluminum triethyl, with an aluminum halide for example $AlCl_3$ in a ratio of 0.2–5:1.

The process for the preparation of acrylonitrile copolymers with at least one (di)olefin of the present invention can be carried out operating both in mass and in solution, using solvents of either an aliphatic or aromatic nature, by reacting the comonomers with molar ratios acrylonitrile/(di)olefin ranging from 0.1:1 to 10:1, the ratio 1:1 being preferred.

The reaction is carried out at temperatures lower than 80° C., at atmospheric pressure and using molar ratios monomers/aluminum/zirconium ranging from 500–50,000/10–500/1.

According to the present invention, the preferred diolefins which can be copolymerized with acrylonitrile are conjugated diolefins such as 1,3-butadiene or isoprene, whereas the preferred olefins are ethylene, propylene or $C_4$–$C_8$ alpha-olefins such as 1-butene, 1-hexene, 1-octene.

Some illustrative but non-limiting examples are provided for a better understanding of the present invention and for its embodiment.

Comparative Example 1

The following products were charged into a glass reactor in an inert atmosphere and under magnetic stirring: 1.396 g of $ZnCl_2$ (10 mmoles) previously dried under vacuum at a temperature of 300° C.; 6.6 ml of acrylonitrile (100 mmoles) purified by distillation on $CaH_2$.

The reactor was then placed in a bath of acetone and dry ice at a temperature of –78° C. and 93 mg of benzoylperoxide (0.4 mmoles); 5.4 g of 1,3-butadiene (100 mmoles) were added to the suspension.

After 1 hour of reaction at 60° C., 4 ml of methanol acidified with HCl and 100 ml of pure methanol were added to the reaction mixture.

The copolymer obtained, yellow-orange coloured, was filtered, washed with methanol and dried under vacuum at room temperature. Yield 3.74 g (conversion with respect to the acrylonitrile: 35%).

Comparative Example 2

The following products were charged in order into a glass reactor, maintained at a temperature of –78° C. by means of a bath of acetone and dry ice, in an inert atmosphere and under magnetic stirring: 6.6 ml of acrylonitrile (100 mmoles) purified by distillation on $CaH_2$; 2.7 ml of $EtAlCl_2$ 1.8M in toluene (4.86 mmoles); 6.5 ml of $VOCl_3$ 0.0149M in toluene (0.097 mmoles); 9.2 g of 1,3-butadiene (170 mmoles).

After 1 hour of reaction at 0° C., 8 ml of methanol acidified with HCl and 100 ml of pure methanol were added to the reaction mixture.

The copolymer obtained, brown-coloured, was filtered, washed with methanol and dried under vacuum at room temperature. Yield 3.938 g (conversion with respect to the acrylonitrile: 37%).

Comparative Example 3

The following products were charged in order into a glass reactor, maintained at a temperature of –78° C. by means of a bath of acetone and dry ice, in an inert atmosphere and under magnetic stirring: 6.6 ml of acrylonitrile (100 mmoles) purified by distillation on $CaH_2$; 2.7 ml of $EtAlCl_2$ 1.8M in toluene (4.86 mmoles); 6.4 ml of $Cp_2TiCl_2$ 0.0151M in toluene (0.097 mmoles); 9.2 g of 1,3-butadiene (170 mmoles).

After 1 hour of reaction at 0° C., 8 ml of methanol acidified with HCl and 100 ml of pure methanol were added to the reaction mixture.

The copolymer obtained, yellow-coloured, was filtered, washed with methanol and dried under vacuum at room temperature. Yield 0.161 g (conversion with respect to the acrylonitrile: 1%).

Comparative Example 4

The following products were charged in order into a glass reactor, maintained at a temperature of –78° C. by means of a bath of acetone and dry ice, in an inert atmosphere and under magnetic stirring: 6.6 ml of acrylonitrile (100 mmoles) purified by distillation on $CaH_2$; 2.7 ml of $EtAlCl_2$ 1.8M in toluene (4.86 mmoles); 0.011 ml of $SnCl_4$ (0.097 mmoles); 9.2 g of 1,3-butadiene (170 mmoles).

After 1 hour of reaction at 0° C., 8 ml of methanol acidified with HCl and 100 ml of pure methanol were added to the reaction mixture.

The copolymer was filtered, washed with methanol and dissolved in 150 ml of methylethylketone, to which 13 mg of stabilizer Irganox 1010 (Ciba-Geigy) were added. The copolymer was then reprecipitated by the addition to the solution of methylethylketone of 100 ml of methanol.

The copolymer obtained, yellow-coloured, was filtered, washed with methanol and dried under vacuum at room temperature. Yield 1.393 g (conversion with respect to the acrylonitrile: 13%).

Comparative Example 5

The following products were charged in order into a glass reactor, maintained at a temperature of –78° C. by means of a bath of acetone and dry ice, in an inert atmosphere and under magnetic stirring: 6.6 ml of acrylonitrile (100 mmoles) purified by distillation on $CaH_2$; 2.7 ml of $EtAlCl_2$ 1.8M in toluene (4.86 mmoles); 9.2 g of 1,3-butadiene (170 mmoles).

After 1 hour of reaction at 0° C., 8 ml of methanol acidified with HCl and 100 ml of pure methanol were added to the reaction mixture.

The copolymer was filtered, washed with methanol and dissolved in 150 ml of methylethylketone, to which 16 mg of stabilizer Irganox 1010 (Ciba-Geigy) were added. The copolymer was then reprecipitated by the addition to the solution of methylethylketone of 100 ml of methanol.

The copolymer obtained, yellow-coloured, was filtered, washed with methanol and dried under vacuum at room temperature. Yield 0.922 g (conversion with respect to the acrylonitrile: 9%).

Comparative Example 6

The following products were charged in order into a glass reactor, maintained at a temperature of –78° C. by means of a bath of acetone and dry ice, in an inert atmosphere and under magnetic stirring: 6.6 ml of acrylonitrile (100 mmoles) purified by distillation on $CaH_2$; 25.5 mg of $CpZrCl_3$ (0.097 mmoles); 9.2 g of 1,3-butadiene (170 mmoles).

After 1 hour of reaction at 0° C., 8 ml of methanol acidified with HCl and 100 ml of pure methanol were added to the reaction mixture.

No copolymer was obtained.

EXAMPLE 1

The following products were charged in order into a glass reactor, maintained at a temperature of –78° C. by means of a bath of acetone and dry ice, in an inert atmosphere and under magnetic stirring: 6.6 ml of acrylonitrile (100 mmoles) purified by distillation on $CaH_2$; 2.7 ml of $EtAlCl_2$ 1.8M in toluene (4.86 mmoles); 6.5 ml of $Cp_2ZrCl_2$ 0.0149M in toluene (0.097 mmoles); 9.2 g of 1,3-butadiene (170 mmoles).

After 1 hour of reaction at 0° C., 8 ml of methanol acidified with HCl and 100 ml of pure methanol were added to the reaction mixture.

The copolymer obtained, white-coloured, was filtered, washed with methanol and dried under vacuum at room temperature. Yield 1.262 g (conversion with respect to the acrylonitrile: 12%).

EXAMPLE 2

The following products were charged in order into a glass reactor, maintained at a temperature of −78° C. by means of a bath of acetone and dry ice, in an inert atmosphere and under magnetic stirring: 6.6 ml of acrylonitrile (100 mmoles) purified by distillation on $CaH_2$; 2.7 ml of $EtAlCl_2$ 1.8M in toluene (4.86 mmoles); 25.5 mg of $CpZrCl_3$ (0.097 mmoles); 9.2 g of 1,3-butadiene (170 mmoles).

After 1 hour of reaction at 0° C., 8 ml of methanol acidified with HCl and 100 ml of pure methanol were added to the reaction mixture.

The copolymer obtained, white-coloured, was filtered, washed with methanol and dried under vacuum at room temperature. Yield 2.535 g (conversion with respect to the acrylonitrile: 23%).

EXAMPLE 3

The following products were charged in order into a glass reactor, maintained at a temperature of −78° C. by means of a bath of acetone and dry ice, in an inert atmosphere and under magnetic stirring: 6.6 ml of acrylonitrile (100 mmoles) purified by distillation on $CaH_2$; 2.7 ml of $EtAlCl_2$ 1.8M in toluene (4.86 mmoles); 6.5 ml of $Cp_2ZrCl_2$ 0.0149M in toluene(0.097 mmoles); 17 ml of isoprene (170 mmoles).

After 1 hour of reaction at 0° C., 8 ml of methanol acidified with HCl and 100 ml of pure methanol were added to the reaction mixture.

The copolymer was filtered, washed with methanol and dissolved in 150 ml of methylethylketone, to which 12 mg of stabilizer Irganox 1010 (Ciba-Geigy) were added. The copolymer was then reprecipitated by the addition to the solution of methylethylketone of 100 ml of methanol.

The copolymer obtained, white-coloured, was filtered, washed with methanol and dried under vacuum at room temperature. Yield 1.313 g (conversion with respect to the acrylonitrile: 11%).

EXAMPLE 4

The following products were charged in order into a glass reactor, maintained at a temperature of −78° C. by means of a bath of acetone and dry ice, in an inert atmosphere and under magnetic stirring: 6.6 ml of acrylonitrile (100 mmoles) purified by distillation on $CaH_2$; 2.7 ml of $EtAlCl_2$ 1.8M in toluene (4.86 mmoles); 25.5 mg of $CpZrCl_3$ (0.097 mmoles); 17 ml of isoprene (170 mmoles).

After 1 hour of reaction at 0° C., 8 ml of methanol acidified with HCl and 100 ml of pure methanol were added to the reaction mixture.

The copolymer was filtered, washed with methanol and dissolved in 150 ml of methylethylketone, to which 12 mg of stabilizer Irganox 1010 (Ciba-Geigy) were added. The copolymer was then reprecipitated by the addition to the solution of methylethylketone of 100 ml of methanol.

The copolymer obtained, white-coloured, was filtered, washed with methanol and dried under vacuum at room temperature. Yield 1.719 g (conversion with respect to the acrylonitrile: 14%).

EXAMPLE 5

The following products were charged in order into a glass reactor, maintained at a temperature of −78° C. by means of a bath of acetone and dry ice, in an inert atmosphere and under magnetic stirring: 6.6 ml of acrylonitrile (100 mmoles) purified by distillation on $CaH_2$; 2.7 ml of $EtAlCl_2$ 1.8M in toluene (4.86 mmoles); 25.5 mg of $CpZrCl_3$ (0.097 mmoles).

0.5 g of propylene (12 mmoles) were bubbled into the reaction mixture during a period of 1 hour, maintaining the reactor at a temperature of 0° C.

At the end, 8 ml of methanol acidified with HCl and 150 ml of pure methanol were added.

The copolymer obtained, white-coloured, was filtered, washed with methanol and dried under vacuum at room temperature. Yield 0.125 g (conversion with respect to the propylene: 14%).

We claim:

1. A process for the preparation of copolymers of acrylonitrile with at least one (di)olefin which comprises reacting the monomers in the presence of a catalytic system consisting essentially of:

i) a complex of zirconium having the formula:

$$ZrA_aB_b \qquad (I)$$

wherein A represents a cyclopentadienyl, indenyl or fluorenyl group, optionally substituted with $C_1$–$C_4$ alkyl groups, B represents a hydrogen atom, a halogen or a $C_1$–$C_8$ (iso)alkyl, alkoxyl or carboxyl radical, a is an integer equal to 1 or 2, b is an integer equal to 2 or 3, with a+b=4;

ii) an aluminumalkyl halide having the general formula:

$$AlR_nX_m \qquad (II)$$

wherein R represents a $C_1$–$C_4$ (iso)alkyl group, X is a halogen, m and n are integers equal to 1 or 2 so that m+n=3.

2. The process according to claim 1, wherein the comonomers are reacted with molar ratios acrylonitrile/(di)olefin ranging from 0.1:1 to 10:1.

3. The process according to claim 1 or 2, wherein the reaction is carried out using molar ratios monomers/aluminum/zirconium ranging from 500–50,000/10–500/1.

4. The process of claim 1, wherein said cyclopentadienyl is selected from the group consisting of bis (cyclopentadienyl), pentamethylcyclopentadienyl, indenyl, bis(indenyl), fluorenyl and bis(fluorenyl).

5. The process of claim 1 wherein a is 2 and A are the same or different.

6. The process of claim 5, wherein said A groups are joined by an alkyl bridge.

7. The process of claim 1 wherein said complex of zirconium is selected from the group consisting of $CpZrCl_3$; $CpZrBr_3$; $Cp_2ZrCl_2$; $Cp_2ZrBr_2$; $Cp^*ZrCl_3$; $Cp^*ZrBr_3$; $Cp^*_2ZrCl_2$; $Cp^*_2ZrBr_2$; $CpZr(OCH_3)_3$; $CpZr(OC_2H_5)_3$; $CpZr(OCH_3)_2$; $Cp_2Zr(OC_2H_5)_2$; $Cp^*Zr(OCH_3)_3$; $Cp^*Zr(OC_2H_5)_3$; $Cp^*_2Zr(OCH_3)_2$; $Cp^*_2Zr(OC_2H_5)_2$; $CpZr(CH_3)_3$; $CpZr(C_2H_5)_3$; $Cp^*ZrH_3$; $Cp^*Zr(CH_3)_3$; $Cp^*Zr(C_2H_5)_3$; $Cp_2ZrH_2$; $Cp_2Zr(CH_3)_2$; $Cp^*_2ZrH_2$; $Cp^*_2Zr(CH_3)$ $_2$; IndZrCl$_3$; IndZrBr$_3$; Ind$_2$ZrCl$_2$; IndZr(OCH$_3$)$_3$; IndZr(OC$_2$H$_5$)$_3$; Ind$_2$Zr(OCH$_3$)$_2$; IndZrH$_3$; IndZr(CH$_3$)$_3$; IndZr(C$_2$H$_5$)$_3$; Ind$_2$ZrH$_2$; Ind$_2$Zr(CH$_3$)$_2$; FluZrCl$_3$; FluZrBr$_3$; Flu$_2$ZrCl$_2$; FluZr(OCH$_3$)$_3$; Flu$_2$Zr(OCH$_3$)$_2$; FluZrH$_3$; FluZr(CH$_3$)$_3$; CpCp*ZrCl$_2$; CpCp*Zr(OCH$_3$)$_2$; CpCp*ZrH$_2$; CpCp*Zr(CH$_3$)$_2$; CpIndZrCl$_2$; CpIndZr(OCH$_3$)$_2$; CpIndZrH$_2$; CpIndZr(CH$_3$)$_2$; CpFluZrCl$_2$; CpFluZr(OCH$_3$)$_2$; CpFluZrH$_2$; CpFluZr(CH$_3$)$_2$; Cp*IndZrCl$_2$; Cp*IndZr(OCH$_3$)$_2$; Cp*IndZrH$_2$; Cp*IndZr(CH$_3$)$_2$; Cp*FluZrCl$_2$; Cp*FluZr(OCH$_3$)$_2$; Cp*FluZrH$_2$; Cp*FluZr(CH$_3$)$_2$; IndFluZrCl$_2$; IndFluZr(OCH$_3$)$_2$; IndFluZrH$_2$; IndFluZr(CH$_3$)$_2$; CH$_2$(Cp)$_2$ZrCl$_2$; CH$_2$(Cp)$_2$Zr(OCH$_3$)$_2$; CH$_2$(Cp)$_2$ZrH$_2$; CH$_2$(Cp)$_2$Zr(CH$_3$)$_2$; CH$_2$(Ind)$_2$ZrCl$_2$; CH$_2$(Ind)$_2$Zr(OCH$_3$)$_2$; CH$_2$(Ind)$_2$Zr(CH$_3$)$_2$; CH$_2$(Flu)$_2$Zr(CH$_3$)$_2$; CH$_2$(Ind)ZrCl$_2$; Et(Cp)$_2$ZrCl$_2$; CH$_2$(Cp)(Ind)Zr(OCH$_3$)$_2$; CH$_2$(Cp)(Ind)ZrH$_2$; Et(Cp)$_2$ZrH$_2$; CH$_2$(Flu)(Ind)ZrCl$_2$; CH$_2$(Cp)(Ind)Zr(CH$_3$)$_2$; CH$_2$(Flu)(Ind)Zr(OCH$_3$)$_2$; CH$_2$(Flu)(Ind)ZrH$_2$; CH$_2$(Flu)(Ind)Zr(CH$_3$)$_2$; CH$_2$(Flu)(Cp)ZrCl$_2$; CH$_2$(Flu)(Cp)Zr(CH$_3$)$_2$; Et(Cp)$_2$Zr(OCH$_3$)$_2$; Et(Ind)$_2$ZrBr$_2$; Et(Flu)$_2$ZrCl$_2$; Et(Flu)$_2$Zr(CH$_3$)$_2$; Et(Cp)(Ind)ZrCl$_2$; Et(Cp)(Ind)Zr(CH$_3$)$_2$; and Et(Flu)(Ind)ZrCl$_2$, wherein Cp is cyclopentadienyl, Cp* is pentamethylcyclopentadienyl, Ind is indenyl, Flu is fluorenyl and Et is ethylidene.

8. The process of claim 1, wherein said alkyl aluminum halide is selected from the group consisting of chloroaluminumdiethyl, dichloroaluminum ethyl, bromoaluminumdiethyl and dibromoaluminumethyl.

* * * * *